(12) United States Patent
Norris et al.

(10) Patent No.: US 8,498,796 B2
(45) Date of Patent: Jul. 30, 2013

(54) PERCEPTION MODEL FOR TRAJECTORY FOLLOWING AUTONOMOUS AND HUMAN AUGMENTED SPEED CONTROL

(75) Inventors: William Robert Norris, Rock Hill, SC (US); Bernard Edwin Romig, Illinois City, IL (US); John Franklin Reid, Moline, IL (US)

(73) Assignee: Deere & Company, Moline, IL (US)

( * ) Notice: Subject to any disclaimer, the term of this patent is extended or adjusted under 35 U.S.C. 154(b) by 1622 days.

(21) Appl. No.: 11/673,648

(22) Filed: Feb. 12, 2007

(65) Prior Publication Data
US 2008/0195293 A1    Aug. 14, 2008

(51) Int. Cl.
*B60T 7/12*    (2006.01)

(52) U.S. Cl.
USPC .................. 701/98; 701/93; 701/44; 180/197

(58) Field of Classification Search
USPC ....................... 701/98, 93; 180/197
See application file for complete search history.

(56) References Cited

U.S. PATENT DOCUMENTS

| | | | |
|---|---|---|---|
| 3,480,768 A | 11/1969 | Sogge | |
| 4,758,959 A | 7/1988 | Thoone et al. | |
| 5,163,530 A | 11/1992 | Nakamura et al. | |
| 5,358,317 A | 10/1994 | Cikanek | |
| 5,475,591 A * | 12/1995 | Suzuki et al. | 701/98 |
| 5,545,960 A | 8/1996 | Ishikawa | |
| 5,671,140 A | 9/1997 | Bessacini et al. | |
| 5,684,691 A | 11/1997 | Orbach et al. | |
| 5,704,200 A | 1/1998 | Chmielewski, Jr. et al. | |
| 5,863,105 A | 1/1999 | Sano | |
| 5,875,108 A | 2/1999 | Hoffberg et al. | |
| 5,899,288 A * | 5/1999 | Schubert et al. | 180/89.12 |
| 5,901,246 A | 5/1999 | Hoffberg et al. | |
| 5,940,814 A | 8/1999 | Jiang et al. | |
| 5,956,250 A * | 9/1999 | Gudat et al. | 701/26 |
| 5,968,103 A | 10/1999 | Rocke | |
| 5,974,352 A | 10/1999 | Shull | |
| 5,983,161 A * | 11/1999 | Lemelson et al. | 701/301 |
| 6,038,505 A * | 3/2000 | Probst et al. | 701/65 |
| 6,041,320 A | 3/2000 | Qin et al. | |
| 6,064,933 A | 5/2000 | Rocke | |
| 6,070,118 A | 5/2000 | Ohta et al. | |
| 6,081,750 A | 6/2000 | Hoffberg et al. | |
| 6,125,314 A * | 9/2000 | Graf et al. | 701/53 |
| 6,188,945 B1 * | 2/2001 | Graf et al. | 701/58 |
| 6,208,981 B1 | 3/2001 | Graf et al. | |
| 6,223,117 B1 | 4/2001 | Labuhn et al. | |
| 6,226,389 B1 * | 5/2001 | Lemelson et al. | 382/104 |

(Continued)

OTHER PUBLICATIONS

Shoreshi, R.A. Intelligent Control Systems. Modern Control Systems by M.K. Masten, Lesson 10, 1995. pp. 375-408.

(Continued)

*Primary Examiner* — Thomas Black
*Assistant Examiner* — Wae Louie
(74) *Attorney, Agent, or Firm* — Yee & Associates, P.C.

(57) ABSTRACT

A speed control method of a vehicle including the steps of obtaining a steering angle, a velocity error and a distance error. The velocity and the distance error being determined by mathematical combinations of a GPS position, a required path and speed set points. The steering angle, velocity errors and distance error are applied to fuzzy logic membership functions to produce an output that is applied to a velocity rule base. An output from the velocity rule base is defuzzified to produce a speed signal.

18 Claims, 11 Drawing Sheets

U.S. PATENT DOCUMENTS

| | | | |
|---|---|---|---|
| 6,233,515 B1 | 5/2001 | Engelman et al. | |
| 6,317,686 B1 | 11/2001 | Ran | |
| 6,321,153 B1* | 11/2001 | Rocke et al. | 701/50 |
| 6,353,785 B1 | 3/2002 | Shuman et al. | |
| 6,385,519 B2 | 5/2002 | Rocke | |
| 6,430,506 B1* | 8/2002 | Mon et al. | 701/301 |
| 6,442,463 B1* | 8/2002 | Qiu et al. | 701/44 |
| 6,480,766 B2 | 11/2002 | Hawthorne et al. | |
| 6,480,768 B1* | 11/2002 | Torii | 701/23 |
| 6,487,477 B1 | 11/2002 | Woestman et al. | |
| 6,487,500 B2* | 11/2002 | Lemelson et al. | 701/301 |
| 6,553,130 B1* | 4/2003 | Lemelson et al. | 382/104 |
| 6,580,973 B2 | 6/2003 | Leivian et al. | |
| 6,584,382 B2* | 6/2003 | Karem | 701/3 |
| 6,611,781 B1 | 8/2003 | Gutmann | |
| 6,615,126 B1 | 9/2003 | Potter et al. | |
| 6,675,081 B2 | 1/2004 | Shuman et al. | |
| 6,735,515 B2 | 5/2004 | Bechtolsheim et al. | |
| 6,795,763 B2 | 9/2004 | Yao et al. | |
| 6,799,105 B2 | 9/2004 | Stout et al. | |
| 6,813,562 B2* | 11/2004 | Altan et al. | 701/301 |
| 6,836,719 B2 | 12/2004 | Andersson et al. | 701/93 |
| 6,856,903 B2* | 2/2005 | Ishigami et al. | 701/480 |
| 6,898,585 B2 | 5/2005 | Benson et al. | |
| 6,906,639 B2* | 6/2005 | Lemelson et al. | 340/903 |
| 6,925,425 B2 | 8/2005 | Remboski et al. | |
| 7,035,834 B2 | 4/2006 | Jacobson | |
| 7,039,551 B2 | 5/2006 | Shu et al. | |
| 7,124,027 B1 | 10/2006 | Ernst et al. | |
| 7,178,819 B2* | 2/2007 | Scherl et al. | 180/170 |
| 7,222,007 B2 | 5/2007 | Xu et al. | |
| 7,239,945 B2 | 7/2007 | Hiemer et al. | |
| 7,251,638 B2 | 7/2007 | Fujii et al. | |
| 7,263,419 B2 | 8/2007 | Wheals et al. | |
| 7,289,611 B2 | 10/2007 | Iggulden et al. | |
| 7,359,770 B2* | 4/2008 | Cole | 701/19 |
| 7,389,178 B2 | 6/2008 | Raz et al. | |
| 7,451,005 B2 | 11/2008 | Hoffberg et al. | |
| 7,451,032 B2 | 11/2008 | Brown et al. | |
| 7,451,033 B2 | 11/2008 | Xu et al. | |
| 7,475,052 B2 | 1/2009 | Ide | |
| 7,499,787 B2 | 3/2009 | Hrovat et al. | |
| 7,561,054 B2 | 7/2009 | Raz et al. | |
| 7,561,951 B2 | 7/2009 | Rao et al. | |
| 7,610,123 B2 | 10/2009 | Han et al. | |
| 7,769,512 B2* | 8/2010 | Norris et al. | 701/44 |
| 7,895,135 B2 | 2/2011 | Norris et al. | |
| 7,970,512 B2 | 6/2011 | Lu et al. | |
| 8,165,916 B2 | 4/2012 | Hoffberg et al. | |
| 8,195,364 B2 | 6/2012 | Norris et al. | |
| 2002/0105428 A1 | 8/2002 | Benson et al. | |
| 2002/0120371 A1 | 8/2002 | Leivian et al. | |
| 2002/0138187 A1 | 9/2002 | Qiu et al. | |
| 2003/0065432 A1 | 4/2003 | Shuman et al. | |
| 2003/0135290 A1* | 7/2003 | Yao et al. | 700/50 |
| 2003/0171869 A1 | 9/2003 | Potter et al. | |
| 2003/0217021 A1 | 11/2003 | Jacobson | |
| 2004/0064229 A1 | 4/2004 | Stout et al. | |
| 2004/0088093 A1 | 5/2004 | Yao et al. | |
| 2004/0158371 A1 | 8/2004 | Iggulden et al. | |
| 2004/0243368 A1 | 12/2004 | Hiemer et al. | |
| 2005/0149240 A1 | 7/2005 | Tseng et al. | |
| 2005/0197994 A1 | 9/2005 | Fuji et al. | |
| 2005/0273240 A1* | 12/2005 | Brown et al. | 701/70 |
| 2006/0080022 A1 | 4/2006 | Hrovat et al. | |
| 2006/0149472 A1 | 7/2006 | Han et al. | |
| 2006/0200258 A1 | 9/2006 | Hoffberg et al. | |
| 2006/0253240 A1 | 11/2006 | Rao et al. | |
| 2007/0005212 A1 | 1/2007 | Xu et al. | |
| 2007/0083318 A1 | 4/2007 | Parikh | |
| 2008/0033636 A1 | 2/2008 | Ryu et al. | |
| 2008/0086248 A1 | 4/2008 | Lu et al. | |
| 2008/0195281 A1 | 8/2008 | Norris et al. | |
| 2008/0195282 A1 | 8/2008 | Norris et al. | |
| 2008/0195293 A1* | 8/2008 | Norris et al. | 701/98 |
| 2008/0195569 A1 | 8/2008 | Norris et al. | |
| 2011/0137526 A1 | 6/2011 | Kim | |
| 2012/0158247 A1 | 6/2012 | Norris et al. | |
| 2012/0271517 A1 | 10/2012 | Norris et al. | |

OTHER PUBLICATIONS

W.R. Norris, et al. A Design Tool for Operator-Adaptive Steering Controllers. American Society of Agricultural Engineers. vol. 46(3): 883-891. Jun. 2003.

Filla, Reno et el. "Dynamic Simulation of Construction Machinery: Towards an Operator Model." NCFP 105-11.5. p. 429-438, 2005.

Filla, Reno et al. "Using Dynamic Simulation in the Development of Construction Machinery." The Eighth Scandinavian International Conference on Fluid Power, SICFP'03, May 7-9, 2003, Tampere, Finland.

Singh, Sanjiv. "The State of the Art in Automation of Earthmoving," ASCE Journal of Aerospace Engineering, vol. 10, #4, Oct. 1997.

Larsson, Jonas. "Concepts for Multi-Domain Simulation with Application to Construction Machinery." 2001, Linkoping Studies in Science and Technology. Thesis No. 870. Institute of Technology, Linkopings Universitet, Division of Fluid and Mechanical Engineering Systems, Department of Mechanical Engineering, Linkopings Universitet, SE-581 83 Linkoping, Sweden.

Ericsson, Allan et al, "Mechanical Dynamics: A model for predicting digging forces when working in gravel or other granulated material." 15:th ADAMS European Users Conference, p. 1-9, 2000, Rome.

Norris, William R. et al. "Hierarchical Rule-Base Reduction for a Fuzzy Logic Based Human Operator Performance Model.", 2006.

Norris, William R. "Disclosures.", 2003.

Ackermann et al., "Automatic Car Steering Control Bridges Over the Driver Reaction Time," Academy of Sciences of the Czech Rpublic, 33(1):61-74, Published in 1997.

Jamshidi et al., Fuzzy Logic and Control: Software and Hardware Applications, Martine (Ed.), PTR Prentice-Hall, Upper Saddle River, New Jersey, Chapter 1, pp. 1-9, Published in 1993.

Norris et al., "A Novel Real-Time Human Operator Performance Model for Performing Adaptive System Design," Automation Technology for Off-Road Equipment, Proceedings of the Jul. 26-27, 2002 Conference, pp. 287-306, Jul. 26, 2002. (Abstract only).

Norris et al., "Rule-Base Reduction for a Fuzzy Human Operator Performance Model," Applied Engineering in Agriculture, 22(4):611-618, Jul. 2006. (Abstract only).

Norris et al., "Perception Model for Trajectory Following Autonomous and Human Augmented Steering Control," U.S. Appl. No. 13/459,138 filed Apr. 28, 2012, 26 pages.

* cited by examiner

PERCEPTION MODEL FOR TRAJECTORY FOLLOWING AUTONOMOUS AND HUMAN AUGMENTED SPEED CONTROL

FIELD OF THE INVENTION

The present invention relates to a method of speed control, and, more particularly to an autonomous speed control of a vehicle.

BACKGROUND OF THE INVENTION

Automatic control of complex machinery, such as moving vehicles exists, for example, the control systems for aircraft autopilots. Just as a man-machine interface is required for the man to control the machinery an automation of the control system is largely specific to the particular machinery that is to be controlled. For example, pilots, even after extensive training on a particular aircraft, do not qualify for piloting a similar aircraft, without extensive training on the alternate aircraft.

Agricultural machinery has become more expensive and complex to operate. Traditionally, human machine control has been limited to open-loop control design methods, where the human operator is assumed to receive appropriate feedback and perform adequate compensation to ensure that the machines function as required and to maintain stable operation. Design methods have included using an expert operator and fine-tuning the control with non-parametric feedback from the operator in terms of verbal cues. These approaches do not always translate to the best quantitative design or overall human-machine synergy.

Assuming that an individual expert operator is the only method of ensuring qualitative response presents several problems. One problem with this assumption is that humans are not the same, with varying perceptions, experience, reaction time, response characteristics and expectations from the machine. The result may be a perceived lack in the qualitative aspects of the human machine interface for some operators. The task of designing optimal human-machine system performance without a consistent operator becomes a daunting one, as there are no methods for setting appropriate constraints. Additionally, expert operators are themselves different in terms of level of efficiency, aggressiveness and sensitivity. Expert operators adapt very quickly to machine designs, including inadequate ones. The result is that qualitative design change effectiveness is not guaranteed since they are applied based on an operator's continuously adapting perception of the machine performance.

Path tracking is one of the most significant functions of autonomous vehicles. An important aspect of path tracking is the speed control.

What is needed is an autonomous control system for a dynamic environment where rollover, lateral slip and deviation from the path require consideration and that requires little or no compensation for sensor noise.

SUMMARY OF THE INVENTION

The present invention provides a trajectory following autonomous speed control system for the speed control of a vehicle.

The invention comprises, in one form thereof, a speed control method of a vehicle including the steps of obtaining a steering angle, a velocity error and a distance error. The velocity and the distance errors being determined by mathematical combinations of a GPS position, a required path and speed set points. The steering angle, velocity error and distance error are applied to fuzzy logic membership functions to product an output that is applied to a velocity rule base. An output from the velocity rule base is defuzzified to produce a speed signal.

DETAILED DESCRIPTION OF THE INVENTION

Figure 1:
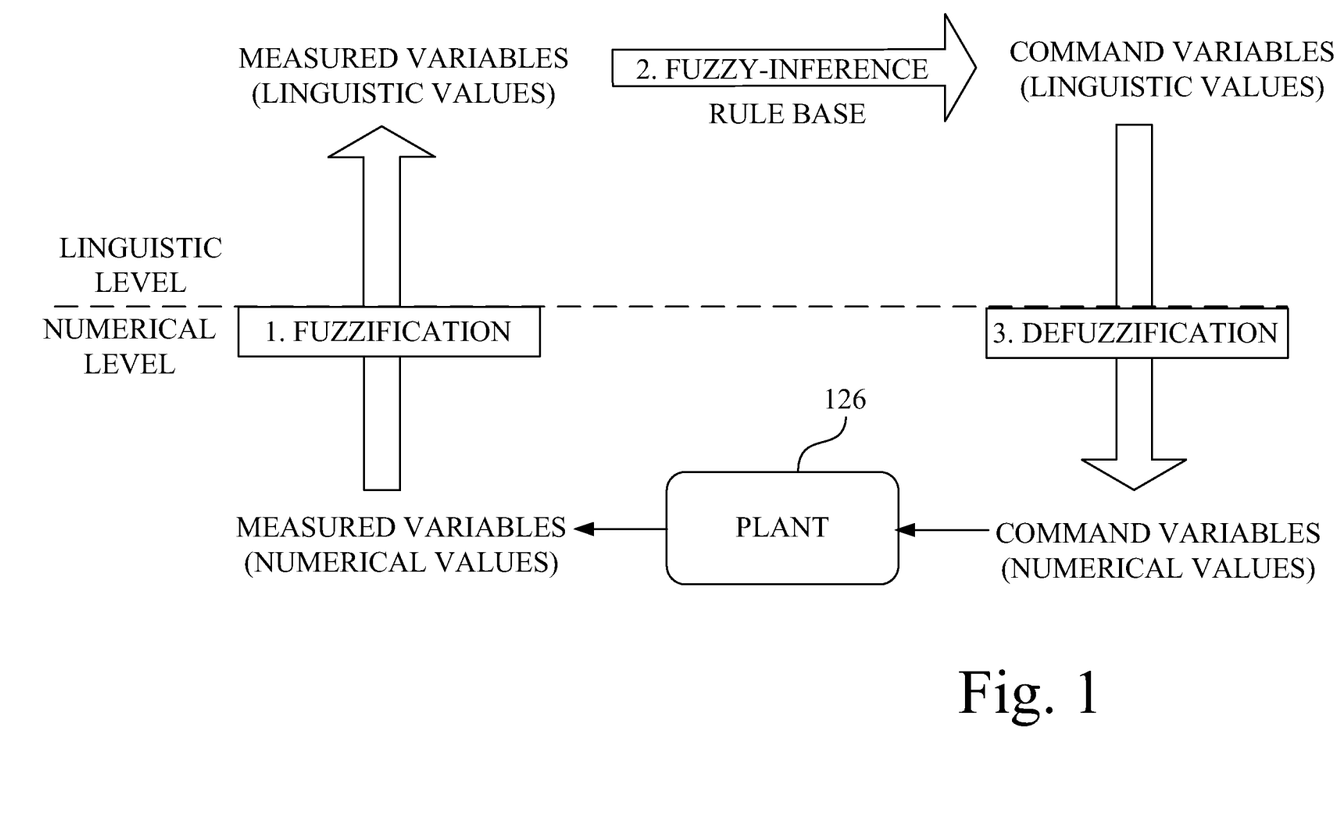
FIG. 1 is a schematic illustration of the use of fuzzy logic in an embodiment of the method of the present invention.
Figure 2:
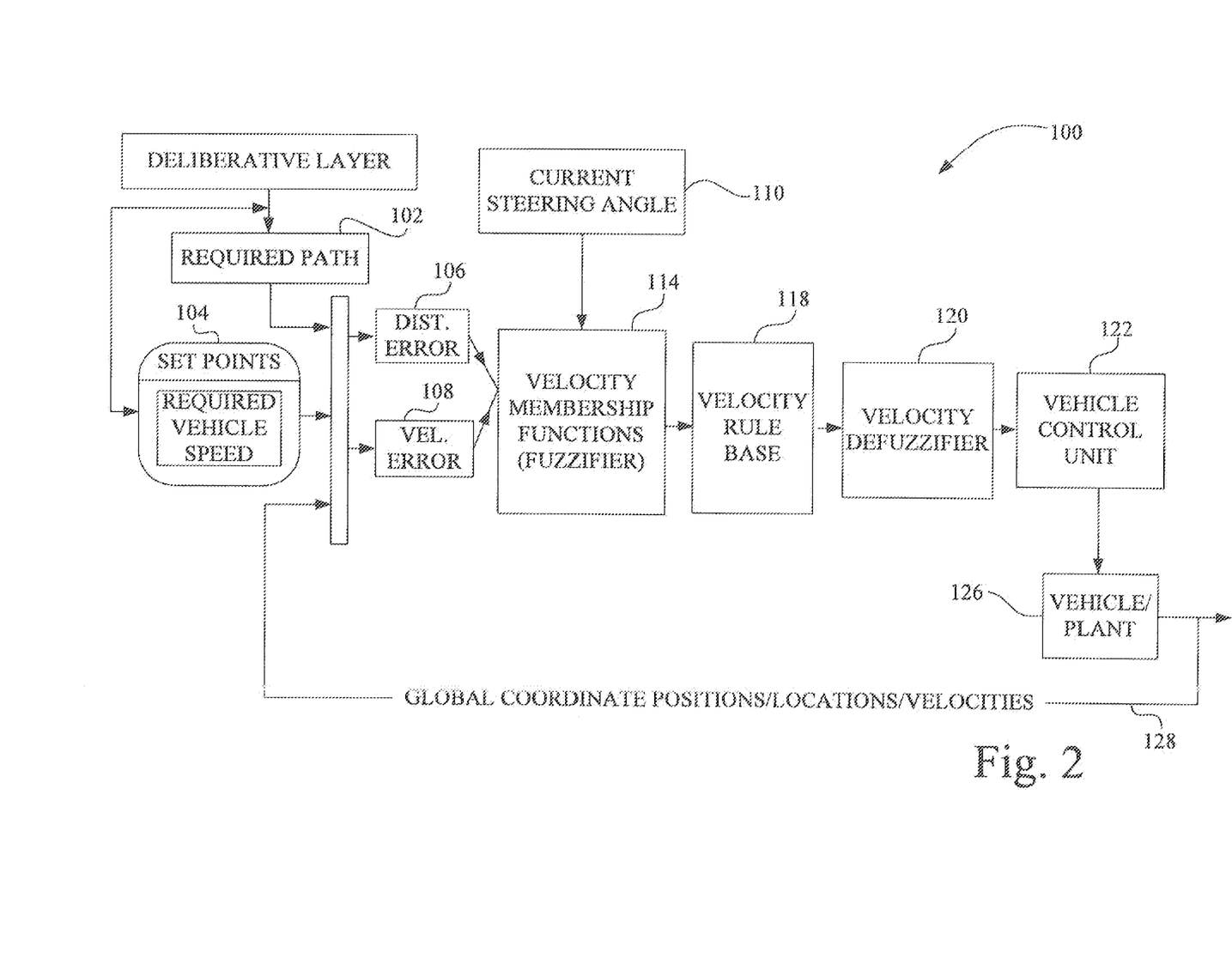
FIG. 2 schematically illustrates a model for trajectory following autonomous speed control and human augmented speed control, of the present invention.

Referring now to the drawings, and more particularly to FIGS. 1 and 2, there are shown schematic illustrations of an approach used in an embodiment of a method of the present invention. The goal is to provide for a trajectory following autonomous speed control and/or human augmented speed control functions, which is undertaken by the use of a fuzzy logic controller structure. The autonomous speed control includes the fuzzification of the input variables, the application of the variables to a fuzzy inference and rule base construction, and the defuzzification of the output variables. The fuzzification step converts control inputs into a linguistic format using membership functions. The membership functions are based on the outputs from an error interpreter. The input variables to the model include several performance related measurable items. To reduce computational effort, linear approximations are implemented. A fuzzy membership function for the various linguistic variables are chosen to be pi-type or trapezoidal in nature.

As illustrated in FIG. 1, measured variables having numeric values are fuzzified into a linguistic format. A fuzzy-inference of these fuzzified variables is made by the application of a rule base resulting in command variables having a fuzzy format. These command variables are then defuzzified by converting the command variables to a numeric value that is interfaced with the control system of the vehicle plant. The vehicle responds causing a change in the location of the vehicle, which creates new measured variables based on the new location, and the method continues.

Figure 3:
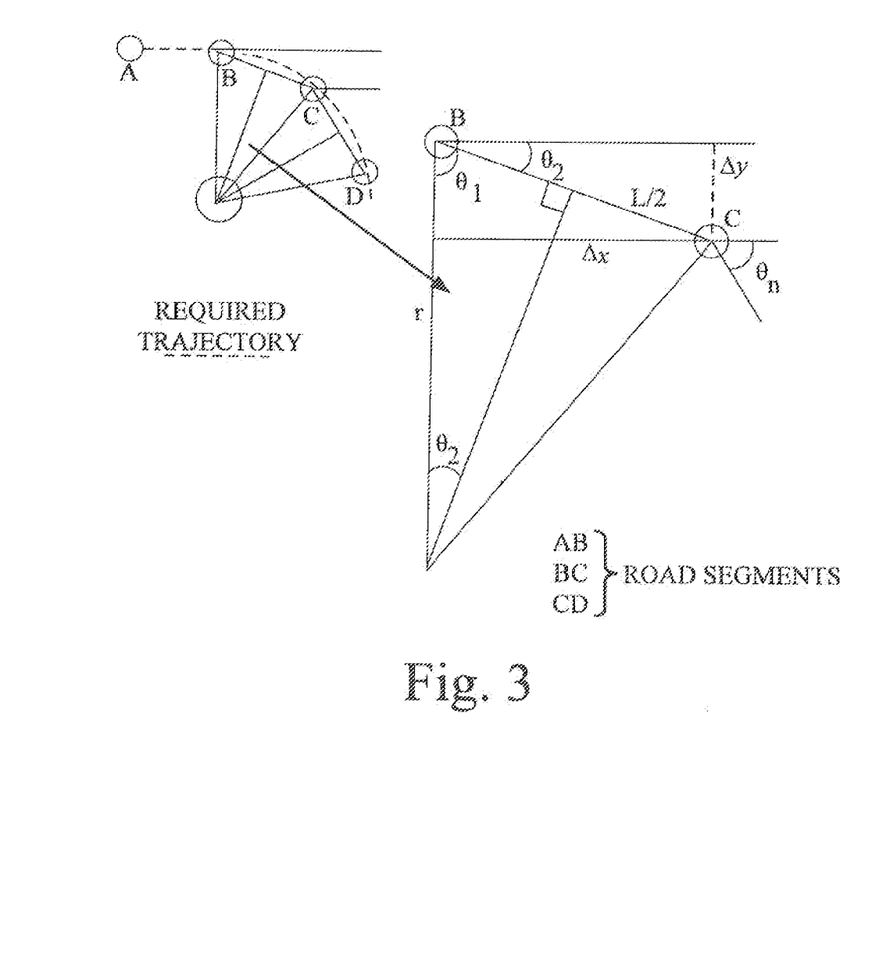
FIG. 3 illustrates a path of the vehicle of FIG. 2 along a preferred path.
Figure 4:
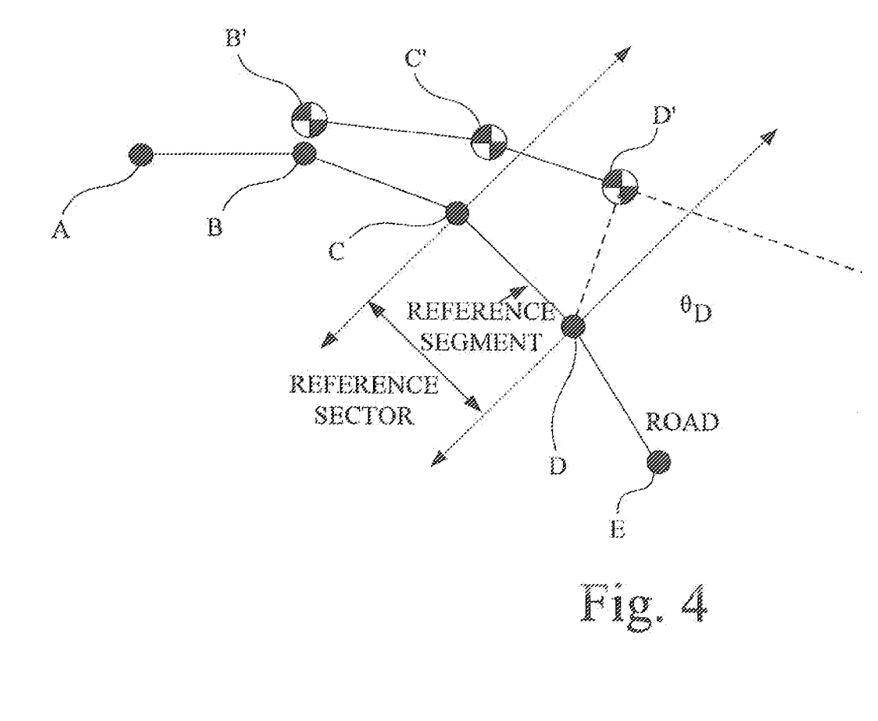
FIG. 4 illustrates a front angle error of the vehicle of FIG. 2 relative to a preferred course.

Now, additionally referring to FIGS. 3 and 4, the approach used for the operator model applies fuzzy logic to perception based modeling. This human model is developed for the purpose of a speed control function. When provided a path or segment, such as segments BC and CD, as shown in FIG. 3, it can be modeled as linear segments, arcs or clothoids and provides illustrations of the errors related to the control objective of following the path parallel to the trajectory at a minimum distance. The problem becomes multi-objective when the vehicle:
(1) Has initial conditions where the vehicle is outside of a given distance from the road or its heading varies from the path heading by a large degree.
(2) Deviates from the path by a large amount and a similar error conditions arise either from obstacles or high speeds with dynamic changes resulting from such things as lateral slip.
(3) The current steering angle of the vehicle may result in a roll over based on the vehicle speed or potential for severe lateral slip.

As a result three errors are used as inputs to the operator model. The operator model is dependent on the errors, but independent of the method used to detect the errors or the set points. The three inputs are the distance error, the velocity error and the steering angle. For ease of reference herein, the steering angle will be referred to as an error even though it may otherwise not be thought of as such.

When a vehicle is traveling from B' to C' the distance from C to C' is larger than the distance from B to B' indicating that the vehicle is departing from the desired path of ABCDE. Further, the vehicle will depart farther at D-D'. This illustrates that the control system would undertake a correction to reduce the difference and control the speed in so doing. It can be seen in FIG. 4 that the speed may need to be increased in the solution since the location of D' is farther from the referenced sector line than C-C'. Again the present invention uses the distance error, the velocity error and the steering angle as inputs in determining the necessary correction in speed of the vehicle.

Now, additionally referring to FIGS. 5-9, the operator model of the present invention is dependent on the errors, but independent of the method used to detect the errors or the set points. The errors are selected based on the difference between the current speed and the set point, the distance from the vehicle to the road and the current steering angle. Steering angle is included to help modulate the speed control to help reduce effects of lateral slip and reduce the risk of roll over.

The controller is constructed as a rate controller, controlling the rate of speed correction given a particular error. The rules involved that are used by methods of the present invention may include the following rules:

If the error is large, increase the rate of correction.
If the error is small, reduce the rate of correction.
If the error is acceptable, take no corrective action.

Rate control has an advantage relative to human operator modeling and is very applicable for several reasons:
(1) It will work on a variety of platforms, independent of vehicle geometry, with little modification and will work independent of set points. It is dependent on a max rate of turn and sampling rates.
(2) It effectively models how most operator controls work, such as joysticks.
(3) It emulates how human operators control vehicle speed while maintaining a consistent steering control throughout a turn.
(4) The effects of discontinuities are reduced as each control action is discretely based on the current errors.

The control strategy for the system demonstrates the multi-objective nature of the controller. Like a human, certain errors can be disregarded depending on where the vehicle is located relative to where it has to go. For example, if the vehicle is far away from the path, the intent is to approach the path as soon as possible. If the vehicle continues to depart from the path then the speed should approach zero. If the steering angle is large, the speed should decrease to mitigate lateral slip and potential roll over. The decisions have to be made around the optimal/mission speed set points. Using the method known as fuzzy relation control strategy (FRCS) the rule base is minimized in this control strategy.

The present invention addresses the fidelity of the response, accuracy and noise from sensory information, response time, control set points based on aggressiveness and mission requirements. The method addresses these elements through the use of applied gains of the inputs and changes to the membership function linguistic variables.

Figure 5:
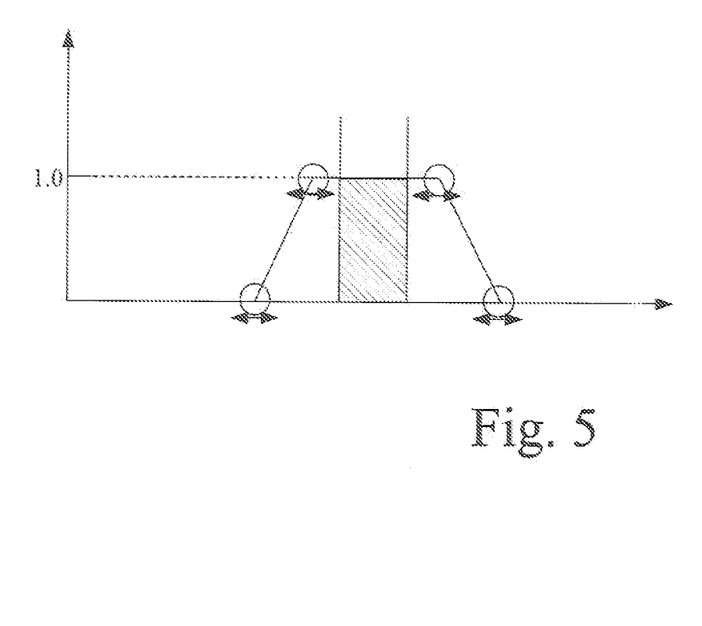
FIG. 5 schematically illustrates a rule used by the performance model of the present invention.
Figure 6:
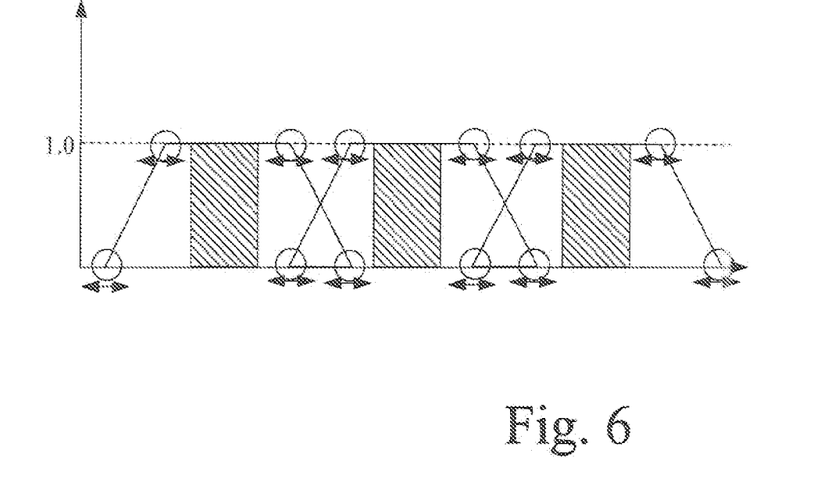
FIG. 6 illustrates the application of several rules used by the performance model of the present invention.
Figure 7:
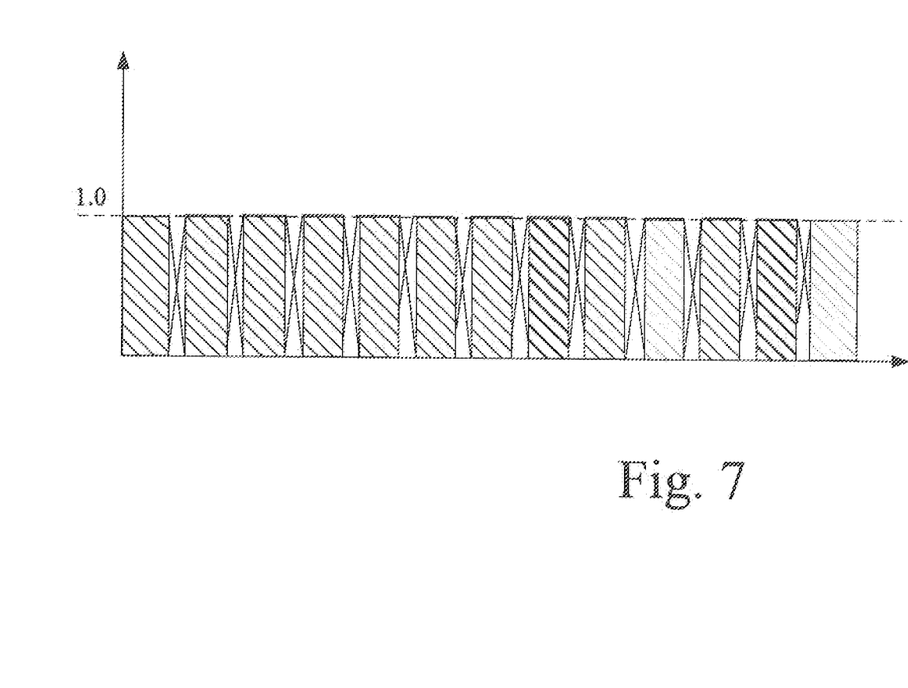
FIG. 7 illustrates that even more certainty is obtained by the including of additional rules in the performance model of the present invention.

The membership functions of the fuzzy system represent how the method interprets error information. Trapezoidal membership functions, such as those shown in FIGS. 5-7 represent regions where the operator is certain of an interpretation, or error classification. Trapezoids are used in FIGS. 5-7 to provide a visual illustration of the membership functions. For a human operator it is almost impossible to measure error exactly, even more so for an inexperienced operator. A regional approach to error classification is most applicable to the present invention. For example, a human operator cannot determine that the vehicle is traveling exactly at 5 meters/second unless he uses some direct measurement of the speed. However, depending on the situation, he can determine he is traveling very fast and away from the path. What is uncertain is where very fast changes to a fast classification or where the transition region between classifications of errors occurs. These transitions are illustrated as angled portions of the trapezoids. A triangular, or a Gaussian distribution with a small standard deviation, membership function by itself is inappropriate in this approach. However, continuing with the regional approach, experience/judgment can be incorporated and represented in two ways. The first is an increase in the number of linguistic variables, or perception granularity, depending on the fidelity required for adequate control. The second aspect is that smaller transition regions between the linguistic variable error classifiers improve system performance. Inexperience and errors in interpreting the information are represented in this model by linguistic variables with extended transition regions such as that shown in FIGS. 5 and 6 and/or by shifting the regions covered by the linguistic variables. This model lends itself very well to interpreting the inexact common noisy data from sensors as well as describing how humans make control decisions with uncertain information. The model uses a common sense rule base that remains unchanged, except in the event of improved perception granularity, where additional rules using the same control strategy would have to be applied. The response fidelity, accuracy, noise from sensory information and judgments are represented and are modifiable. Control set points can be changed without effecting the controller operations using gains based on the mission requirements. An output can also be scale based on operator aggressiveness as the current system provides a signal between one and minus one. The output component of the rules within the rule base can also be modified to provide a more aggressive output.

In FIGS. 5-7 the region of certainty under all situations is illustrated by the shaded box. As the situation changes it shifts away from the region of certainty there is a decreasing likelihood that the rule is going to be effective, as illustrated by the sloped lines. In FIG. 6 as more rules are introduced, as compared to FIG. 5, there is less possibility of an uncertain circumstance. Further, more experience and/or a larger knowledge base, there is more interpretation and response granularity, that yields smaller, less fuzzy transition regions between the rules, as illustrated in FIG. 7.

Figure 8:
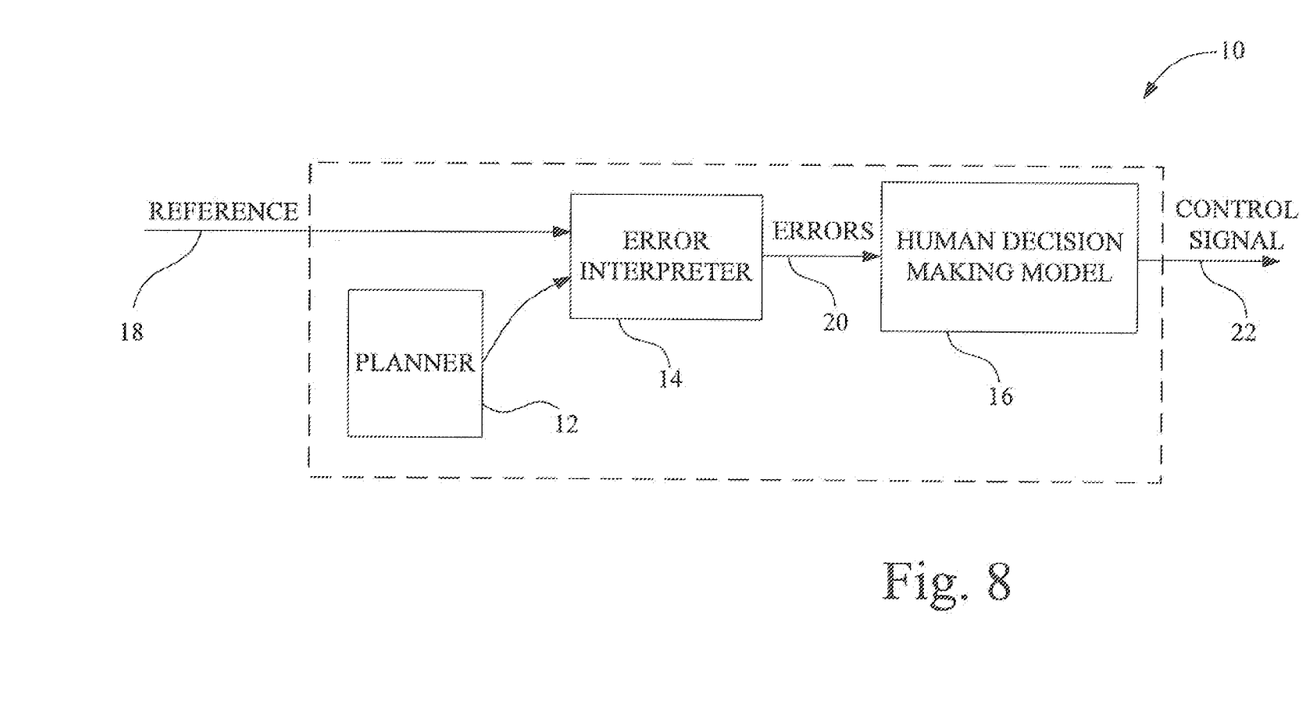
FIG. 8 is a schematic illustration of a human performance model of the present invention.

FIG. 8 schematically illustrates a performance model 10 including a planner portion 12, an error interpreter 14, and a human decision-making model 16. A reference signal 18, as well as set points from planner 12, are utilized by error interpreter 14 to generate errors such as distance error, velocity error and it also utilizes current steering angle information. Error interpreter 14 generates errors 20 that are used by human decision-making model 16 to produce a control signal 22. Control signal 22 in this instance relates to the speed of the vehicle.

Figure 9:
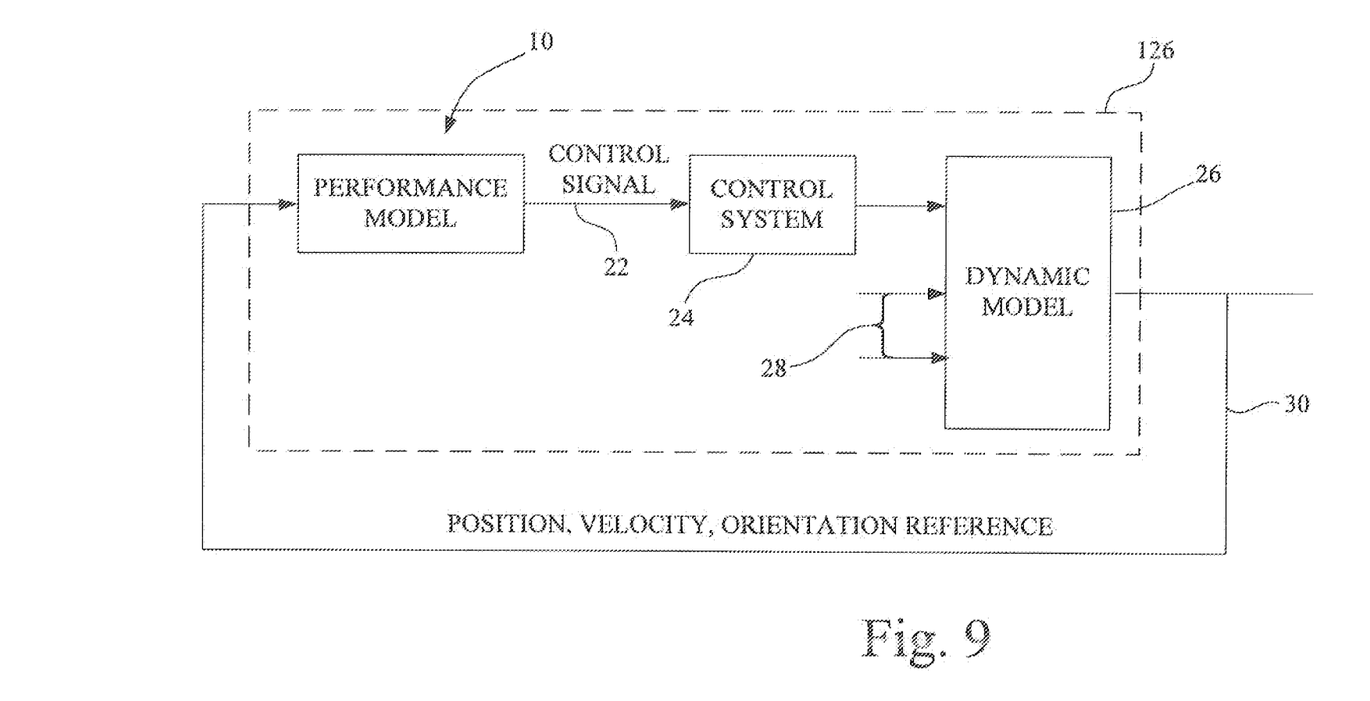
FIG. 9 schematically illustrates a vehicle utilizing the performance model of FIG. 8.

In FIG. 9 performance model 10 feeds control system 24 a control signal 22. Control system 24 provides input into dynamic model 26. Dynamic model 26 may include other inputs 28 other than speed information, such as steering information that may be input on other inputs 28. An output signal from dynamic model 26 is generated and a feedback reference signal 30, which feeds back to reference signal 18, indicates the position, velocity, acceleration and orientation of the vehicle.

As illustrated in FIG. 2, a method 100 includes a deliberative layer that provides a required path 102 and set points necessary to alter the vehicle speed at 104. A distance error 106, a velocity error 108 and a steering angle 110 serve as inputs to fuzzification portion 114. Fuzzification portion 114 utilizes velocity membership functions to interpret the inputs to generate output information for use in velocity rule base 118. The output of velocity rule base 118 is provided to velocity defuzzifier 120 that in turn has an output signal that is supplied to a vehicle control unit 122. Vehicle control unit 122 may be an embedded unit that is part of another control system of a controlled vehicle 126. The position, velocity, acceleration and orientation of vehicle 126 is sensed and fed back as a reference by a feedback loop 128.

Blocks 102 and 104 correspond to planner 12 of FIG. 4. The distance error 106, velocity error 108 and steering angle 110 are utilized as inputs to an error interpreter 14. Distance error 106 and velocity error 108 are determined from mathematical combinations of the information from feedback loop 128 and from the required path 102 and set points 104.

Human perception provides an inexact estimation of error. Exact error measurements are not possible by a human; however, humans can readily determine if an error is acceptable, close or far away from an objective based upon experience. Boundaries between error classifications are where the uncertainty occurs. The trapezoidal representation incorporates the imprecise classification in their transitional sloped areas. The flat areas at the top of the trapezoids represent a region of certainty.

The membership function parameters used in block 114 are tuned to minimized the maximum distance variation from a given trajectory at an optimal or near optimal speed. The tuned membership functions for example can have three linguistic variables in an attempt to minimize computational effort. With additional granularity in the membership functions are needed it can be introduced if necessary. For example, using variables of "too fast", "too slow" and "acceptable speed" easily illustrate the linguistic variables that are common to a human operator and utilized by method 100.

The rule base is derived based on heuristic knowledge. A hierarchical technique is used based on the importance of the inputs relative to their linguistic variable regions. The hierarchy is drawn from the controller objects. The object for the fuzzy logic controller is to provide a speed signal to bring the vehicle to a desired path. In order to incorporate the information, a fuzzy relations control strategy (FRCS) is utilized. The error values are the fuzzy relations control variables (FRCVs). The FRCS applies to an approach with a control strategy that is incorporated into the fuzzy relations between the controller input variables. The FRCS is developed because the problem is multi-objective, where the current object depends on the state of the system and it results in a different control strategy. The control strategy is to minimize the distance from a trajectory in as short a time as possible, to avoid lateral slip and to avoid roll over of the vehicle. The current steering angle of the vehicle incorporated as block 110 is input into fuzzification portion 114 to classify the steering angle. If the vehicle distance is far from a required path and the primary objective is to approach the required path as quickly as possible without spending excessive control energy, the vehicle speed may be an acceptable value that is higher than an acceptable value when the vehicle closely approaches the required path. As such, the definition of acceptable speed is different when the vehicle is a far distance from the required path than it is when the vehicle is a short distance from the path.

The FRCS employed in forming the rule base includes a complete set of control rules for all speed conditions. The size of the rule base is generally reduced by approximately 98% by ignoring the extra rules irrelevant to the control strategy.

Defuzzifying the output of rule base method 118 occurs at step 120 to derive a non-fuzzy or crisp value that best represents the fuzzy value of the linguistic output variable. One method that can be utilized is known as the center of area technique to result in a discrete numeric output.

Figure 10A:
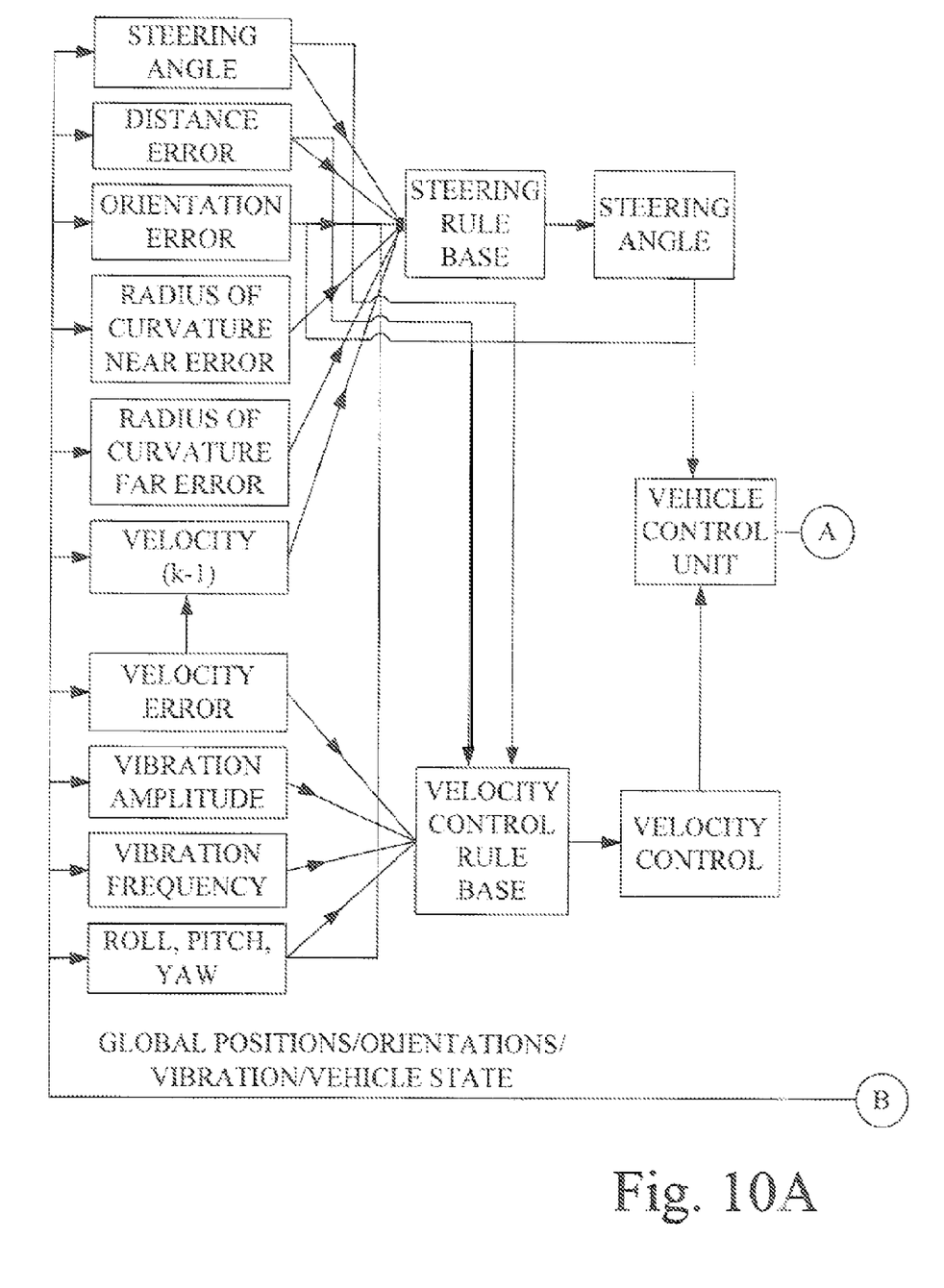
FIG. 10A-C schematically illustrates another embodiment of a fuzzy control system of the present invention.
Figure 10B:
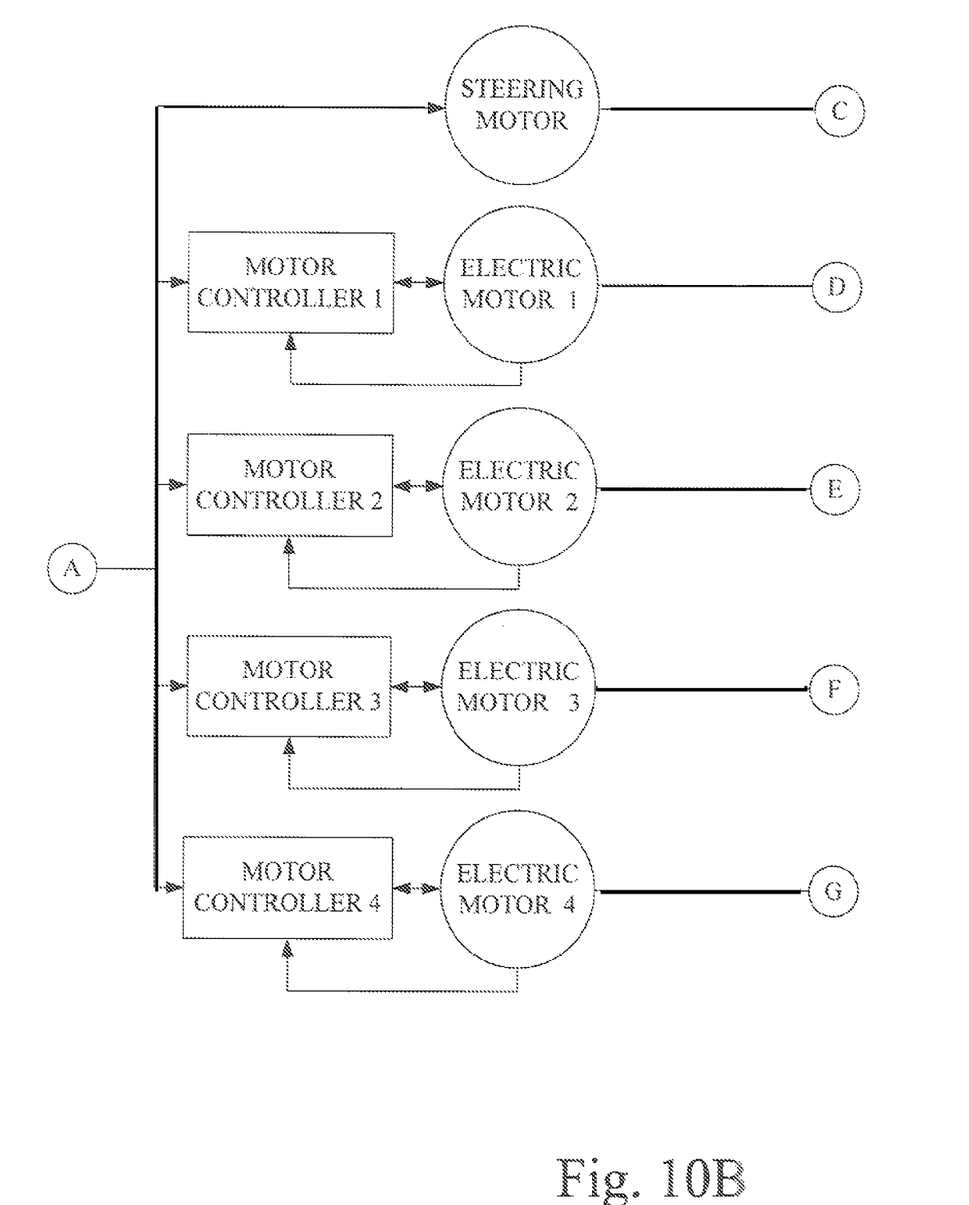
Figure 10C:
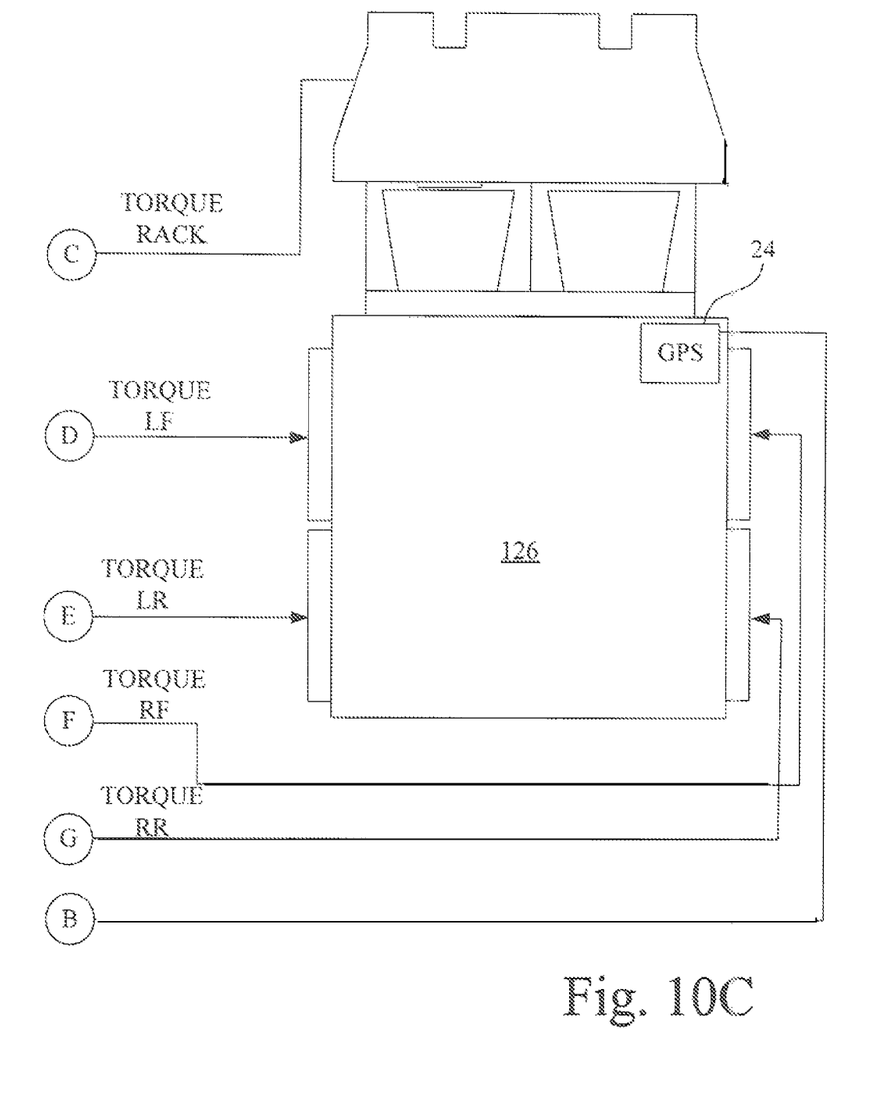

Now, additionally referring to FIGS. 10A-C, there is illustrated another embodiment of the present invention including inputs to both steering and velocity fuzzy control rule bases that result in vehicle control signals that are interpreted and applied to each of four drive motors and a steering motor. The vehicle schematically illustrated has four drive wheels that are independently speed controlled and a steering motor that is used to guide the steering mechanism of the vehicle. Inputs, in addition to those discussed above, are used in this fuzzy rule base system, such as vibration amplitude, vibration frequency and the roll, pitch and yaw of the vehicle. Although shown in a schematic form apart from vehicle 126 it is to be understood that the elements depicted in FIGS. 10A and 10B are functionally located on vehicle 126. The model can also be used apart from a vehicle for simulation purposes. Motors 1-4 represent a drive system that is under control of control system 24.

The method for trajectory following autonomous speed control and/or human augmented speed control functions advantageously provide for autonomous or human augmented system for automatic steering and speed control can be trained or tuned for any platform/vehicle. A control can serve as a component in automated suspension, speed and traction control of the vehicle. The system is flexible in that it is oriented around many set points, which can be changed based on dynamic or mission based environmental factors. The system is also flexible in its use of sensor inputs that provide relevant information, since the calculations utilize errors and are independent of the sensor providing the interpreted information. The system is modular in that it allows additional errors of concern to be added and the original system can be expanded or augmented by the addition of these additional errors. The system is stable for dynamic environments. There is an acceptable region of performance where no control signal is provided and the fuzzy logic system removes chattering, such as bang-bang control effects. The multi-objective non-linear controller improves the response to dynamic changes in the environment. The incoming signals are filtered by way of the trapezoidal membership functions. Sensor information, which is generally noisy, is filtered by the very nature of the system and computation time is reduced allowing for smooth transitions between operating regions. The fuzzy relation control strategy reduces rule base size using error input as a classifier. This allows response granularity where needed and removes effects of non-applicable errors when unnecessary, while ensuring a stable control strategy. The rate of correction can be scaled and imprecise information can be used to determine a reaction, which is appropriate for real world sensors. If the method is used for human augmentation applications, the system can filter extraneous activities so that the human can focus on the task at hand.

Having described the preferred embodiment, it will become apparent that various modifications can be made without departing from the scope of the invention as defined in the accompanying claims.

The invention claimed is:

1. A speed control method of a vehicle, the method comprising the steps of:
   obtaining a steering angle;
   obtaining a velocity error;
   obtaining a distance error, said velocity error and said distance error being determined by mathematical combinations of a GPS position, a required path and speed set points;
   applying said steering angle, said velocity error and said distance error to fuzzy logic membership functions to produce an output that is applied to a velocity rule base;
   defuzzifying an output from said velocity rule base to produce a speed signal;
   receiving said speed signal by a vehicle control unit; and
   changing a speed of the vehicle by said vehicle control unit using said speed signal.

2. The method of claim 1, further comprising the step of changing set points dependent on said distance error.

3. The method of claim 1, further comprising the step of establishing a required path which serves as an input to said obtaining a distance error step.

4. The method of claim 3, wherein said establishing a required path step also serves as an input to said obtaining a velocity error step.

5. The method of claim 3, further comprising the step of establishing required vehicle speed set points as an input to said obtaining a distance error step.

6. The method of claim 5, wherein said establishing required vehicle speed set points step also serves as an input to said obtaining a velocity error step.

7. The method of claim 6, further comprising the step of obtaining at least one of an orientation, a location and a velocity to input to at least one of said obtaining a velocity error step and said obtaining a distance error step.

8. A speed control method of a vehicle, the method comprising the steps of:
   applying a steering angle, a velocity error and a distance error to fuzzy logic membership functions to produce an output that is applied to a velocity rule base;
   defuzzifying an output from said velocity rule base to produce a speed signal;
   receiving said speed signal by a vehicle control unit; and
   changing a speed of the vehicle by said vehicle control unit using said speed signal.

9. The method of claim 8, further comprising the step of changing set points dependent on said distance error.

10. The method of claim 8, further comprising the step of establishing a required path which serves as an input to obtain said distance error.

11. The method of claim 10, wherein said establishing a required path step also serves as an input to obtain said velocity error.

12. The method of claim 10, further comprising the step of establishing required vehicle speed set points as an input to obtain said distance error.

13. The method of claim 12, wherein said establishing required vehicle speed set points step also serves as an input to obtain said velocity error.

14. The method of claim 13, further comprising the step of obtaining at least one of an orientation, a location and a velocity which is used to obtain said velocity error and said distance error.

15. A vehicle, comprising:
   a drive system;
   a speed control system operatively connected to said drive system;
   a steering angle sensor producing a steering angle signal;
   a reference system producing a velocity signal and a distance signal, said speed control system applying said steering angle signal, said velocity signal and said distance signal to fuzzy logic membership functions to produce an output that is applied to a velocity rule base, said velocity rule base producing an output that is defuzzified to produce a speed signal that is supplied to said speed control system to control the speed of said drive system; and
   changing a speed of the vehicle by controlling the speed of said drive system.

16. The vehicle of claim 15, wherein a path is established which serves as a reference for determining said distance signal.

17. The vehicle of claim 16, wherein said path also serves as an input to obtain said velocity signal.

18. The vehicle of claim 17, wherein at least one of an orientation, a location and a velocity of the vehicle is input to said reference system to obtain said velocity signal and said distance signal.

* * * * *